(12) United States Patent
Lin et al.

(10) Patent No.: US 7,439,799 B2
(45) Date of Patent: Oct. 21, 2008

(54) FREQUENCY SHIFT KEYING DEMODULATOR ROBUST FOR FREQUENCY OFFSET

(75) Inventors: Wun-Chi Lin, Ilan (TW); Huihung Chang, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 575 days.

(21) Appl. No.: 11/256,038

(22) Filed: Oct. 19, 2005

(65) Prior Publication Data
US 2007/0046813 A1 Mar. 1, 2007

(30) Foreign Application Priority Data
Aug. 10, 2005 (TW) .............................. 94127110 A

(51) Int. Cl.
*H03D 3/00* (2006.01)
*H04L 27/14* (2006.01)

(52) U.S. Cl. ................... 329/302; 375/324; 375/334
(58) Field of Classification Search ......... 329/300–303; 375/324, 334–337
See application file for complete search history.

(56) References Cited

U.S. PATENT DOCUMENTS
6,278,864 B1 * 8/2001 Cummins et al. ............. 455/73

* cited by examiner

*Primary Examiner*—David Mis
(74) *Attorney, Agent, or Firm*—J.C. Patents

(57) ABSTRACT

A frequency shift keying demodulator robust for frequency offset is provided. The demodulator is used to enable the signal to be received correctly when the frequency offset occurs. A microprocessor of demodulator controls a frequency mixer and a phase difference generator according to the duty cycle of the preamble when receiving the preamble of the demodulated signal. Therefore, the duty cycle of the preamble of the demodulated signal can be close to 50%, and the data from a transmitter is received correctly.

13 Claims, 11 Drawing Sheets

FREQUENCY SHIFT KEYING DEMODULATOR ROBUST FOR FREQUENCY OFFSET

CROSS-REFERENCE TO RELATED APPLICATION

This application claims the priority benefit of Taiwan application serial no. 94127110, filed on Aug. 10, 2005. All disclosure of the Taiwan application is incorporated herein by reference.

BACKGROUND OF THE INVENTION

1. Field of Invention

The present invention relates to a demodulator, and particularly to a frequency shift keying demodulator robust for frequency offset.

2. Description of the Related Art

To transmit signals with a wireless communication system, the information signals to be transmitted must be modulated into a sine wave, followed by sending out the modulated signals. One of the normal modulation modes is called frequency modulation (FM), which is widely used in FM radio and other wireless equipments, such as beepers, mobile phones and wireless phones. Among various FM techniques, there is a so-called "frequency shift keying modulation" (FSK modulation) method, by which a digital data is frequency-modulated with two frequencies $f_1$ and $f_0$ and the modulated signal is sent out. Once the signal modulated with frequency shift keying is transmitted and received by a receiver, the received signal would be restored to its original digital data through demodulation processing.

FIG. 1 is a block diagram of a conventional frequency shift keying receiver. A frequency shift keying receiver 100 includes a receiving antenna 110, a low-noise amplifier (LNA) 120, a frequency mixer 130, a low-pass filter 140, an analog-to-digital converter (ADC) 150 and a demodulator 160. The receiving antenna 110 receives RF signal (radio frequency signal) transmitted by a transmitter. The received signal is then amplified by the LNA 120. Further, the amplified signal is frequency-mixed with a local oscillating signal $f_c$ by the frequency mixer 130, and then produces two part of signals, the high frequency term signal and the low frequency term signal. Then the high frequency term signal is removed by the low-pass filter 140. Furthermore, the signal is sampled by the analog-to-digital converter (ADC) 150 and a digital non-coherent frequency shift key signal (DNFSK signal) is obtained. The DNFSK signal containing modulated data at f1 and f0 is then demodulated by the demodulator 160 to finally get the digital signal transmitted by a transmitter.

FIG. 2 is a block diagram of a conventional frequency shift keying demodulator robust for frequency offset. The conventional frequency shift keying demodulator includes a frequency synthesizer 210, a first frequency mixer 211, a first low-pass filter 212, a second frequency mixer 213, a phase difference generator 214, a second low-pass filter 215 and a decider 216.

First, the first frequency mixer 211 receives a digital non-coherent frequency shift keying signal DNFSK and a frequency synthesizer output signal, for example, a 50 KHz cosine signal, generated by the frequency synthesizer 210. The two received signals are frequency-mixed. Next, the first mixer output is filtered by the first low-pass filter 212 and a baseband signal BS is obtained. The baseband signal BS is the input to the phase difference generator 214 and the second frequency mixer 213. Wherein, the phase difference generator 214 would produce a baseband signal BSQ which has $\pi/4$ phase-shift with respect to the baseband signal BS and send it to the input of second frequency mixer 213. After that, the second frequency mixer 213 would produce another high frequency term signal and low frequency term signal. Finally, the second low-pass filter 215 would filter out the high frequency term signal and left low frequency term signal. The low frequency term signal is the demodulated output. The above-described process can be expressed by the following formulas. First, it is assumed that the baseband signal received by the second frequency mixer 213 is $$BS=\cos(\omega_b t)$$

$$BSQ=\cos(\omega_b(t-\tau))$$

for transmitting logic 1, $$\omega_b=2\pi(f_b+f_1)$$

for transmitting logic 0, $$\omega_b=2\pi(f_b-f_1)$$

In addition, $2\pi f_b \tau = \pi/2$

After frequency-mixing by the second frequency mixer 213, $$\begin{aligned} MIX &= \cos(\omega_b t) * \cos(\omega_b(t-\tau)) \\ &= \frac{1}{2}\cos(2\omega_b t - \omega_b \tau) + \frac{1}{2}\cos(\omega_b \tau) \end{aligned}$$

After being filtered by the second low-pass filter 215, the following is obtained:

$$\frac{1}{2}\cos(\omega_b \tau) = \frac{1}{2}\cos(2\pi(f_b \pm f_1)\tau) = \mp\frac{1}{2}\sin(2\pi f_1 \tau)$$

The decider 216 receives the signal output from the second low-pass filter 215; and according to positive/negative polarity of the sine wave a digital signal is demodulated.

FIG. 3 is a diagram showing digital signal waveforms of the transmitted data and the demodulated data, respectively. Referring to FIG. 3, the waveform 201 is a digital-signal-waveform of preamble transmitted by FSKT (frequency shift keying transmitter), the waveform 202 is a digital-signal-waveform of preamble demodulated by FSKR (frequency shift keying receiver) with little frequency offset and the waveform 203 is a demodulated digital-signal-waveform of preamble with large frequency offset. It can be seen from FIG. 3, if there is no frequency offset occurs with a general FSKR, the duty cycle of the demodulated preamble digital signal would be close to 50%; while for a general FSKR influenced by a frequency offset, the duty cycle of the demodulated preamble digital signal would be departed from 50%, which would significantly increase the possibility of system errors.

To eliminate the above-described problem, a conventional solution is that a frequency-adjustable frequency synthesizer 210, for example, a variable resistor (or variable capacitor, variable inductor and so on) is added in the system and the variable resistor (or variable capacitor, variable inductor and so on) is manually adjusted on production lines before shipment, so that the duty cycle of the demodulated preamble digital signal is close to 50%. The solution, however, is wasteful of manpower and cost that the production efficiency would drop.

SUMMARY OF THE INVENTION

An object of the present invention is to provide a frequency shift keying demodulator robust for frequency offset used for compensating frequency offset.

Another object of the present invention is to provide a frequency shift keying demodulator robust for frequency offset so that the cost will be reduced.

The present invention provides a frequency shift keying demodulator robust for frequency offset, which includes a frequency synthesizer, a first frequency mixer, a first low-pass filter, a phase difference generator, a second frequency mixer, a second low-pass filter, a decider and a microprocessor. The frequency synthesizer is used for outputting a first frequency signal according to frequency control signal. The first frequency mixer receives a frequency shift keying signal (FSKS) and the first frequency signal, frequency-mixes the two signals and then outputs a first mixed-frequency signal. The first low-pass filter is used for filtering the high-frequency component from the first mixed-frequency signal and outputting a low-frequency signal. The phase difference generator receives the LFS and according to the LFS generates a phase changed low-frequency signal with phase difference, which has a phase-shift in comparison with the LFS. The second frequency mixer receives both the low-frequency signal and the phase changed low-frequency signal and frequency-mixes the two received signals and outputs a second mixed-frequency signal. The second low-pass filter is used for filtering the high-frequency component from the second mixed-frequency signal and then outputting a low-frequency signal. The decider receives the low-frequency signal and according to the polarity of the low-frequency signal outputs a demodulated signal. According to the duty cycle of the demodulated signal, the microprocessor outputs the frequency control signal to control the frequency synthesizer.

According to a frequency shift keying demodulator robust for frequency offset provided by the embodiment of the present invention, the above-described microprocessor would, according to the duty cycle of the demodulated signal, output a phase control signal to control the phase of the phase changed low-frequency signal with phase difference output from the phase difference generator.

The present invention provides a frequency shift keying demodulator robust for frequency offset, which includes a phase difference generator, a first frequency mixer, a first low-pass filter, a decider and a microprocessor. The phase difference generator receives both a low-frequency signal and a phase control signal. It generates the phase changed low-frequency signal according to the low-frequency signal and phase control signal. The first frequency mixer receives the low-frequency signal and the phase changed low-frequency signal with phase difference, frequency-mixes the two signals and then outputs a first mixed-frequency signal. The first low-pass filter is used for filtering the high-frequency component from the first mixed-frequency signal and outputting a low-frequency signal. The decider receives the low-frequency signal and according to the polarity of the low-frequency signal outputs a demodulated signal. According to the duty cycle of the demodulated signal, the microprocessor outputs a phase control signal to control the phase difference generator.

According to the embodiment of the present invention, the frequency shift keying demodulator robust for frequency offset provided by the embodiment further includes a frequency synthesizer, a second frequency mixer and a second low-pass filter. The frequency synthesizer is used for outputting a first frequency signal. The second frequency mixer receives both a frequency shift keying signal (FSKS) and a first frequency signal, frequency-mixes the two signals and then outputs a second mixed-frequency signal. The second low-pass filter is used for filtering the high-frequency component from the second mixed-frequency signal and then outputting a low-frequency signal, wherein the microprocessor would, according to the duty cycle of the demodulated signal, output a frequency control signal to control the frequency of the first frequency signal output from the frequency synthesizer.

Since the present invention employs a microprocessor to receive the demodulated signal and according to the duty cycle of, for example, a preamble signal in the demodulated signal to control the frequency synthesizer and the phase difference generator, therefore the duty cycle of the demodulated signal is adjusted to be close to 50% for the receiver to properly receive data.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

Figure 4:
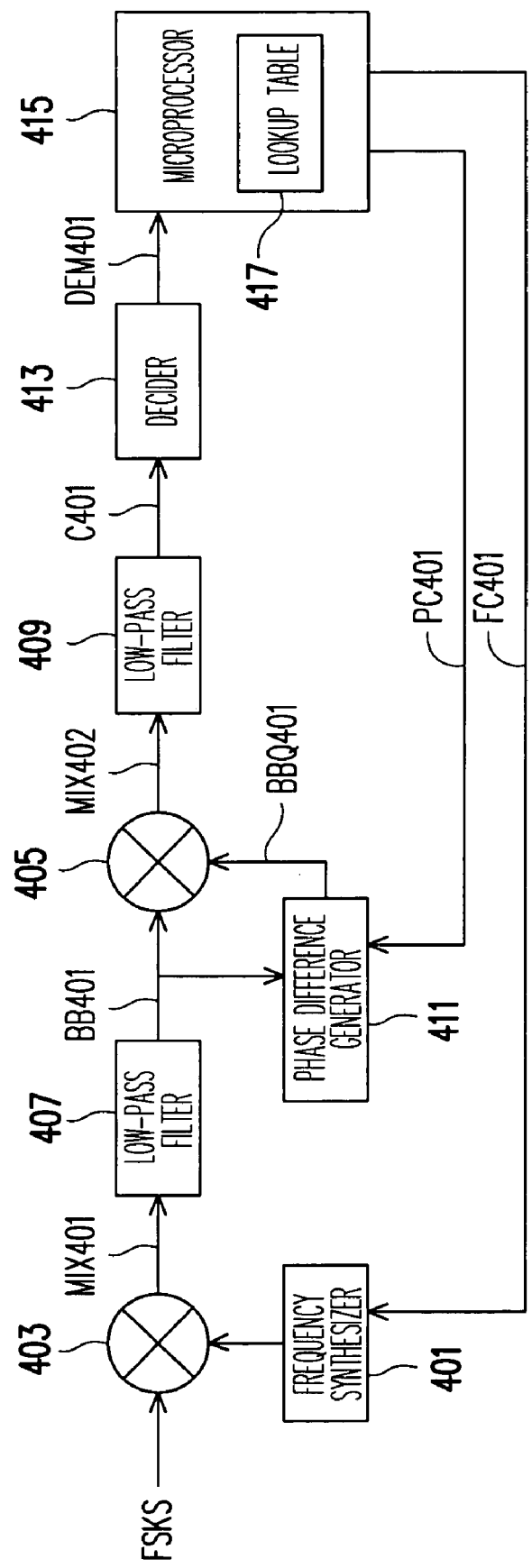
FIG. 4 is a block diagram of a frequency shift keying demodulator robust for frequency offset provided by an embodiment of the present invention.

FIG. 4 is a block diagram of a frequency shift keying demodulator robust for frequency offset provided by an embodiment of the present invention. Referring to FIG. 4, the demodulator herein includes a frequency synthesizer 401, frequency mixers 403 and 405, low-pass filters 407 and 409, a phase difference generator 411, a decider 413 and a microprocessor 415. Wherein, the microprocessor 415 includes a lookup table (LUT) 417 within.

The frequency synthesizer 401 outputs a first frequency signal OC401 according to frequency control signal FC401. The frequency mixer 403 receives a frequency shift keying signal FSKS and the first frequency signal OC401, frequency-mixes the two signals and then outputs a first mixed-frequency signal MIX401. After the low-pass filter 407 filters the high-frequency component from the first mixed-frequency signal MIX401, a low-frequency signal BB401 is output. The phase difference generator 411 receives the low-frequency signal BB401 and according to the low-frequency signal BB401 generates a phase changed low-frequency signal with phase difference BBQ401, which has a phase-shift in comparison with the. low-frequency signal The frequency mixer 405 receives both the low-frequency signal BB401 and the phase changed low-frequency signal with phase difference BBQ401, frequency-mixes the two received signals and outputs a second mixed-frequency signal MIX402. The low-pass filter 409 is used for filtering the high-frequency component from the second mixed-frequency signal MIX402 and then outputting a low-frequency signal C401. The decider 413 receives the low-frequency signal C401 and according to the polarity of the low-frequency signal C401 outputs a demodulated signal DEM401. According to the duty cycle of the demodulated signal DEM401 and the relationships between the frequency control signal FC401 and the duty cycle of the demodulated signal DEM401 and between the phase control signal PC401 and the duty cycle thereof, the microprocessor 415 outputs the frequency control signal FC401 to control the frequency synthesizer 401 and the phase control signal PC401 to control the phase difference generator 411. Wherein, the relationships are provided by the lookup table (LUT) 417 inside the microprocessor 415.

Figure 3:
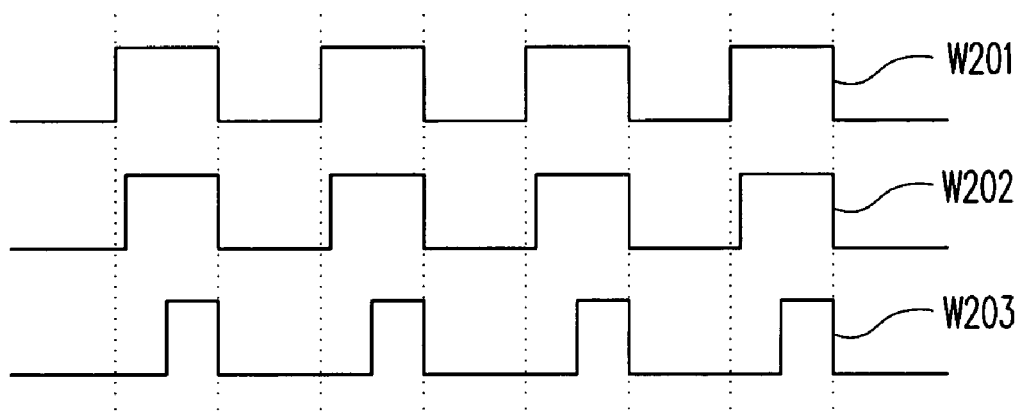
FIG. 3 is diagram showing digital signal waveforms at frequency shift keying transmission end and frequency shift keying receiving end, respectively.
Figure 5A:
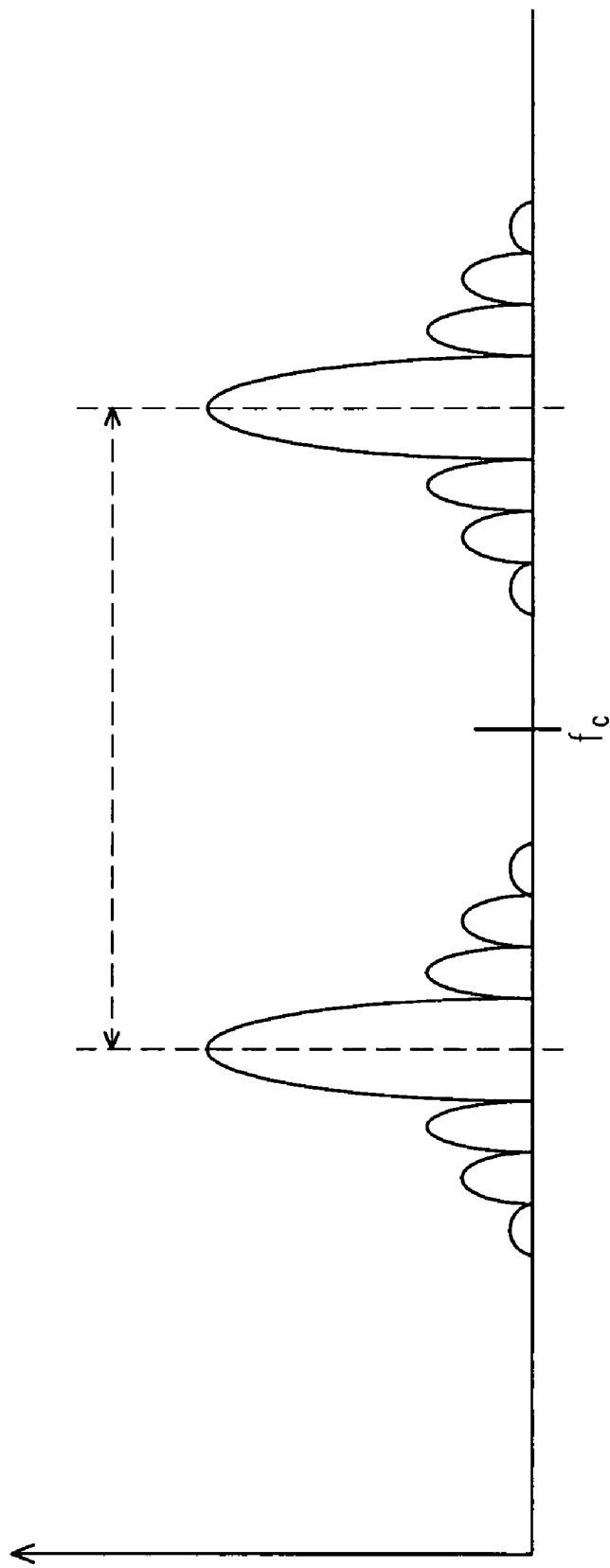
FIG. 5A is a frequency spectrum chart of frequency shift keying signal.
Figure 5B:
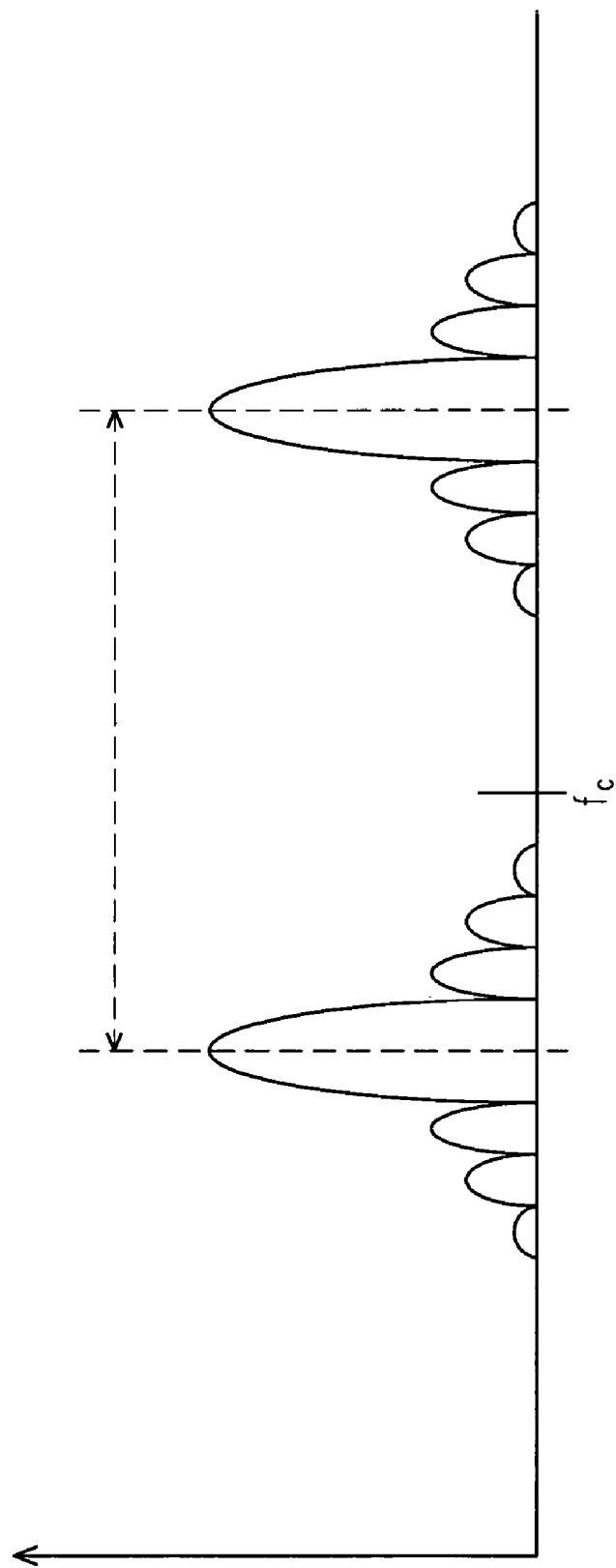
FIG. 5B is a frequency spectrum chart of frequency shift keying signal with frequency offset.
Figure 5C:
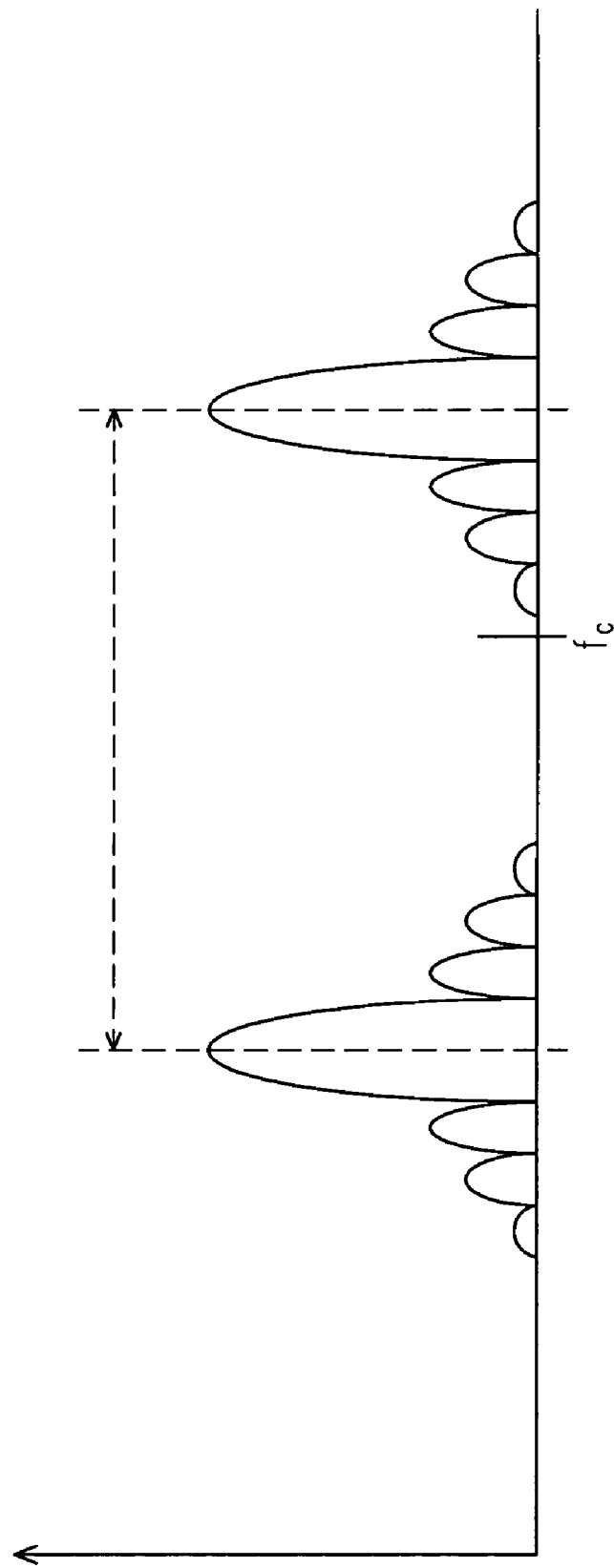
FIG. 5C is another frequency spectrum chart of frequency shift keying signal with frequency offset.
Figure 6:
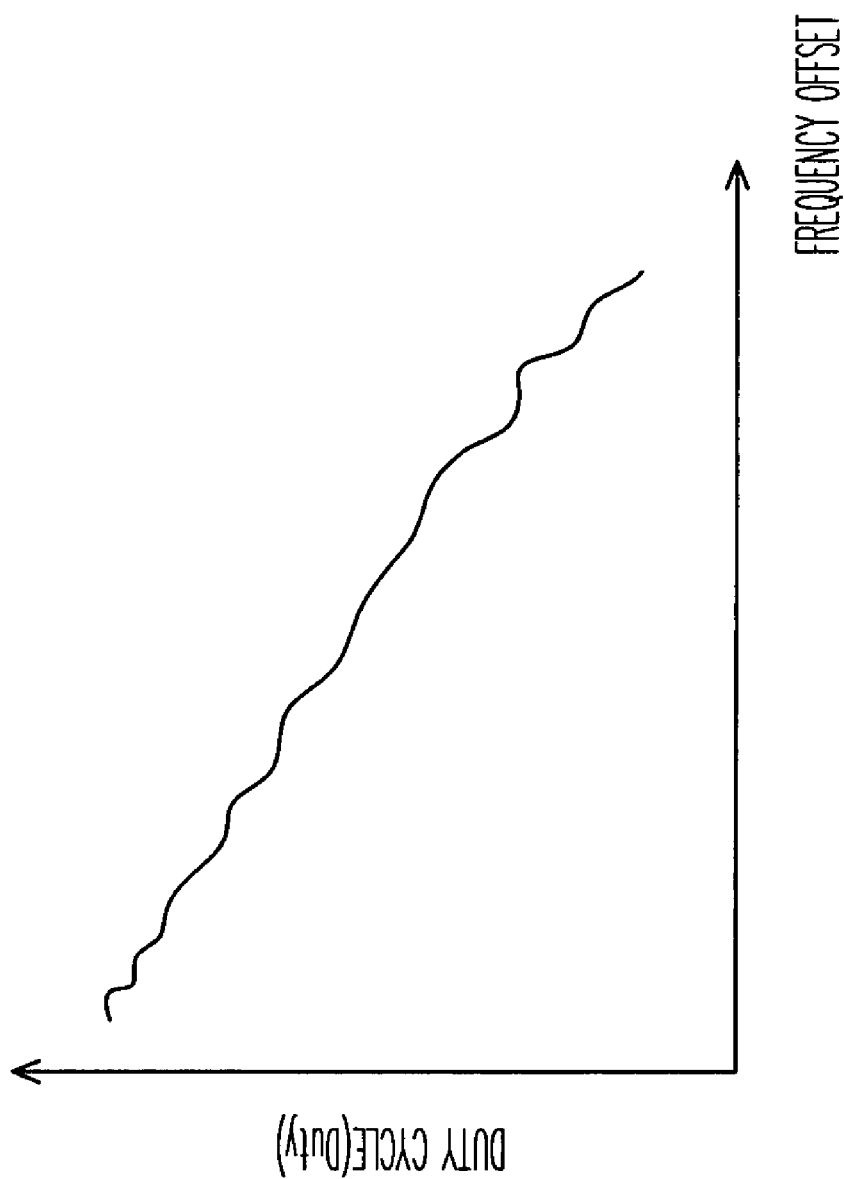
FIG. 6 is a schematic chart showing the relationship between frequency offset and duty cycle of preamble signal.

FIG. 5A is a frequency spectrum chart of frequency shift keying signal. When a frequency offset occurs with the frequency shift keying demodulator (FSKD), for example, a frequency offset caused by an error of a local oscillator in the receiver is present, the resulted frequency spectrum is shown as illustrated in FIG. 5B or 5C. The preamble signal after demodulated would take a waveform shown as W203 illustrated in FIG. 3. In the meantime, the microprocessor 415 receives a signal with W203 waveform illustrated in FIG. 3 and begins with searching the lookup table (LUT) 417, where the data relationships, for example, the relationships shown in FIG. 6, are stored. Thus, according to the duty cycle, a corresponding frequency offset can be found. Afterwards, according to the frequency offset, a frequency control signal FC401 and a phase control signal PC401 are output for controlling the frequency synthesizer 401 and the phase difference generator 411, respectively.

Figure 7:
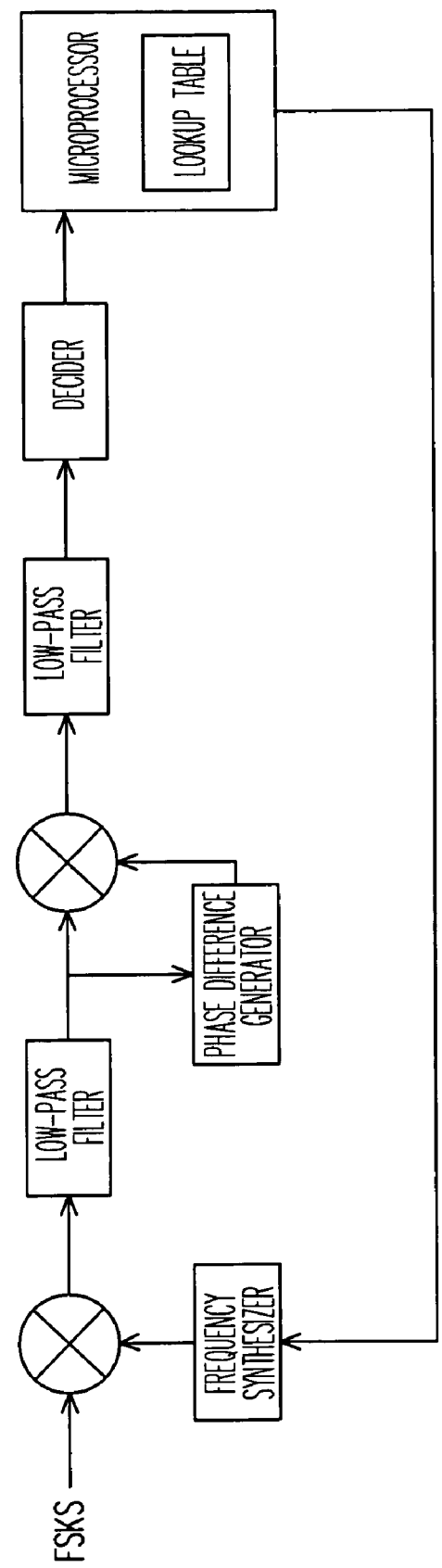
FIG. 7 is a block diagram of another frequency shift keying demodulator robust for frequency offset provided by an embodiment of the present invention.

If the frequency synthesizer 401 can be adjusted very accurately, to compensate the influence of a frequency offset, only the output frequency of the frequency synthesizer 401 needs to be adjusted without adjusting the phase difference generator 411. According to the scheme, the present invention provides another embodiment as shown in FIG. 7. FIG. 7 is a block diagram of another frequency shift keying demodulator robust for frequency offset provided by an embodiment of the present invention. The unique point from FIG. 4 herein is that the microprocessor in FIG. 7 is used for controlling the frequency synthesizer only.

Figure 8:
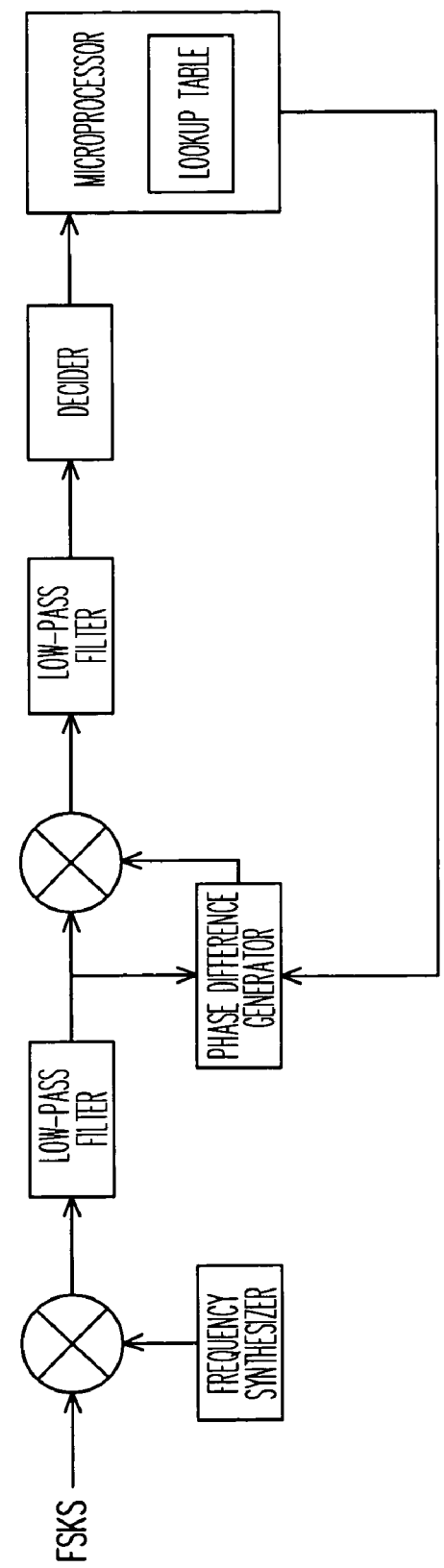
FIG. 8 is a block diagram of a further frequency shift keying demodulator robust for frequency offset provided by an embodiment of the present invention.
Figure 9:
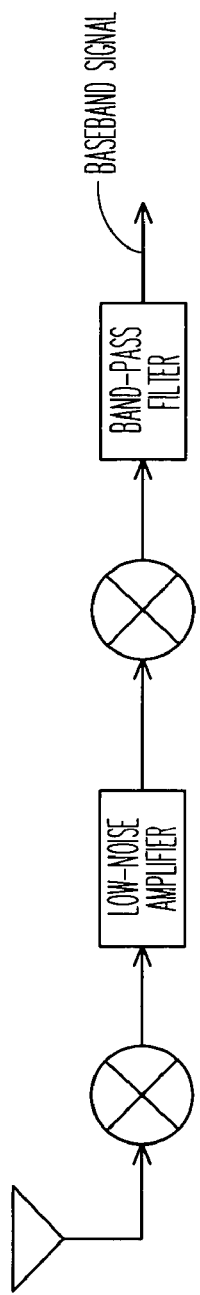
FIG. 9 is a block diagram of a direct down-conversion RF receiver.
Figure 10:
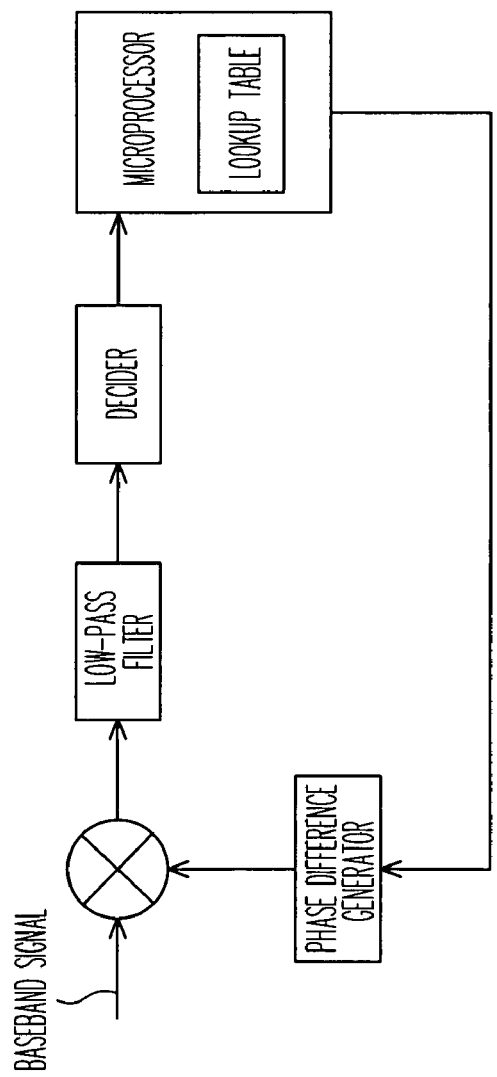
FIG. 10 is a block diagram of a further frequency shift keying demodulator robust for frequency offset provided by an embodiment of the present invention.

On the other hand, if an occurred frequency offset is minor, to compensate the negative influence of a frequency offset, only the phase difference generator 411 needs to be adjusted, which can be implemented according to a further embodiment of the present invention shown in FIG. 8. FIG. 8 is a block diagram of a further frequency shift keying demodulator robust for frequency offset provided by an embodiment of the present invention. The unique point from FIG. 4 herein is that the microprocessor in FIG. 7 is used for controlling the phase difference generator only. Furthermore, if an RF receiver is a direct down-conversion RF receiver, for example, a architecture as shown in FIG. 9 where an RF signal is direct down converted to a baseband signal, the present invention provides a further embodiment as shown in FIG. 10. FIG. 10 is a block diagram of a further frequency shift keying demodulator robust for frequency offset provided by an embodiment of the present invention. The unique point from FIG. 4 herein is that the microprocessor in FIG. 10 is used for controlling the phase difference generator only and the frequency mixer 403 and the low-pass filter 407 in FIG. 4 are saved in FIG. 10.

Figure 1:
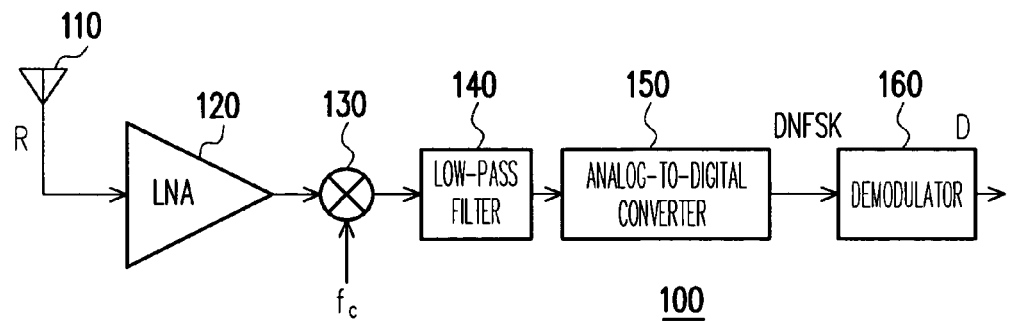
FIG. 1 is a block diagram of a conventional frequency shift keying receiver.
Figure 2:
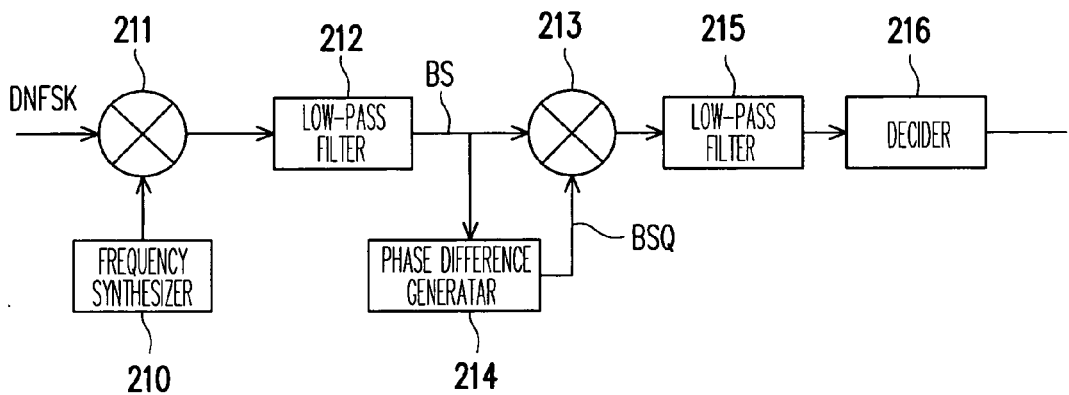
FIG. 2 is a block diagram of a conventional frequency shift keying demodulator robust for frequency offset.
Figure 11:
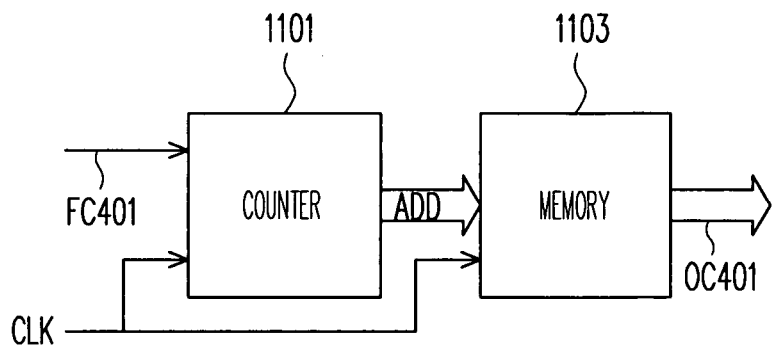
FIG. 11 is the block diagram of the frequency synthesizer in FIG. 4 according to an embodiment of the present invention.

FIG. 11 is the block diagram of the frequency synthesizer in FIG. 4 according to an embodiment of the present invention, wherein the frequency synthesizer circuit is basically a numerically controlled oscillator (NCO), which is specially used for a digital demodulator. A receiver, for example, the one in FIG. 1, uses an analog-to-digital converter (ADC) to sample a middle-frequency signal into a digital signal, where the demodulator thereof must be a digital demodulator and the frequency synthesizer in FIG. 11 is just applicable herein.

The frequency synthesizer in FIG. 11 (a numerically controlled oscillator) includes a counter 1101 and a memory 1103. The counter 1101 receives a frequency control signal FC401 and a clock signal CLK and according to the frequency control signal FC401 outputs a counting signal ADD. The memory receives the counting signal ADD and the clock signal CLK and according to the counting signal ADD outputs a first frequency signal OC401 corresponding to a numerical value stored in a corresponding bit address.

Figure 12:
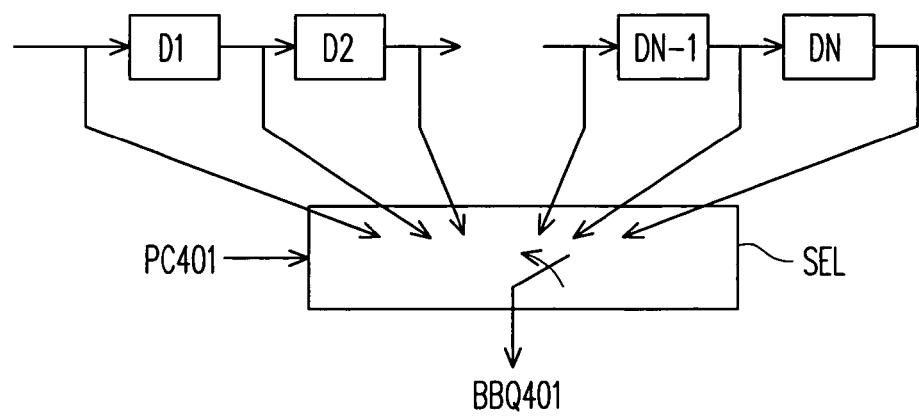
FIG. 12 is the block diagram of the phase difference generator in FIG. 4 according to an embodiment of the present invention.

Similarly, a phase difference generator can be implemented as shown in FIG. 12. FIG. 12 is the block diagram of the phase difference generator in FIG. 4 according to an embodiment of the present invention. Referring to FIG. 12, the circuit includes N pieces of delay components (D1~DN as shown in FIG. 12) and a selection component SEL. Each of the delay components is used for delaying the input signal by a preset time and outputting the delayed input signal, wherein the output end of the $I^{th}$ delay component DI is coupled to the input end of the $(I+1)^{th}$ delay component. The first delay component D1 is used for receiving the baseband signal, where both N and I are natural numbers and 0<I<N. The selection component SEL selects the signal output from a delay component selected from all the delay components as a baseband signal with phase difference BBQ401.

Since the present invention employs a microprocessor to receive the demodulated signal and according to the duty cycle of, for example, a preamble signal in the demodulated signal to control the frequency synthesizer and the phase difference generator, therefore the duty cycle of the demodulated signal is adjusted to be close to 50% for the receiver to properly receive data.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. A frequency shift keying demodulator robust for frequency offset, comprising:

a frequency synthesizer, used for outputting a first frequency signal according to a frequency control signal;

a first frequency mixer, used for receiving a frequency shift keying signal (FSKS) and the first frequency signal, frequency-mixing the two signals and then outputting a first mixed-frequency signal;

a first low-pass filter, used for filtering the high-frequency component from the first mixed-frequency signal and outputting a baseband signal;

a phase difference generator, used for receiving the low-frequency signal and according to the low-frequency signal generating a phase changed low-frequency signal with phase difference, wherein the low-frequency signal with phase difference has a phase-shift in comparison with the low-frequency signal;

a second frequency mixer, used for receiving both the low-frequency signal and the phase changed low-frequency signal with phase difference, frequency-mixing the two received signals and outputting a second mixed-frequency signal;

a second low-pass filter, used for filtering the high-frequency component from the second mixed-frequency signal and then outputting a low-frequency signal;

a decider, used for receiving the low-frequency signal and according to the polarity of the low-frequency signal outputting a demodulated signal; and a microprocessor, used for, according to the duty cycle of the demodulated signal, outputting the frequency control signal to control the frequency synthesizer.

2. The frequency shift keying demodulator robust for frequency offset as recited in claim 1, wherein the microprocessor outputs a phase control signal to control the phase of the baseband signal with phase difference output from the phase difference generator.

3. The frequency shift keying demodulator robust for frequency offset as recited in claim 2, wherein the microprocessor comprises:

a lookup table (LUT), used for providing a relationship between the phase control signal and the duty cycle of the demodulated signal.

4. The frequency shift keying demodulator robust for frequency offset as recited in claim 1, wherein the frequency synthesizer comprises:

a counter, used for receiving the frequency control signal and a clock signal and according to the frequency control signal outputting a counting signal; and a memory, used for receiving the counting signal and the clock signal and according to the counting signal outputting the first frequency signal corresponding to a numerical value stored in a corresponded bit address.

5. The frequency shift keying demodulator robust for frequency offset as recited in claim 1, wherein the microprocessor comprises:

a lookup table (LUT), used for providing a relationship between the frequency control signal and the duty cycle of the demodulated signal.

6. The frequency shift keying demodulator robust for frequency offset as recited in claim 2, wherein the phase difference generator comprises:

N pieces of delay components, wherein each delay component is used for delaying the input signal by a preset time and outputting the delayed input signal; the output end of the $I^{th}$ delay component is coupled to the input end of the $(I+1)^{th}$ delay component; the first delay component is used for receiving the baseband signal, where both N and I are natural numbers and 0<I<N; and a selection component, used for, according to the phase control signal, selecting the signal output from a delay component selected from all the delay components as the baseband signal with phase difference.

7. A frequency shift keying demodulator robust for frequency offset, comprising:

a phase difference generator, used for receiving the low-frequency signal and a phase control signal, according to the low-frequency signal and the phase control signal generating a phase changed low-frequency signal with phase difference, wherein the phase changed low-frequency signal with phase difference has a phase-shift in comparison with the low-frequency signal;

a first frequency mixer, used for receiving the low-frequency signal and the phase changed low-frequency signal with phase difference, frequency-mixing the two signals and then outputting a first mixed-frequency signal;

a first low-pass filter, used for filtering the high-frequency component from the first mixed-frequency signal and outputting a low-frequency signal;

a decider, used for receiving the low-frequency signal and according to the polarity of the low-frequency signal outputting a demodulated signal; and a microprocessor, used for, according to the duty cycle of the demodulated signal, outputting the phase control signal to control the phase difference generator.

8. The frequency shift keying demodulator robust for frequency offset as recited in claim 7, further comprising:

a frequency synthesizer, used for outputting a first frequency signal;

a second frequency mixer, used for receiving a frequency shift keying signal and the first frequency signal, frequency-mixing the two received signals and outputting a second mixed-frequency signal; and a second low-pass filter, used for filtering the high-frequency component from the second mixed-frequency signal and then outputting the baseband signal.

9. The frequency shift keying demodulator robust for frequency offset as recited in claim 8, wherein the microprocessor, according to the duty cycle of the demodulated signal, outputs a frequency control signal to control the frequency of the first frequency signal output from the frequency synthesizer.

10. The frequency shift keying demodulator robust for frequency offset as recited in claim 9, wherein the frequency synthesizer comprises:

a counter, used for receiving the frequency control signal and a clock signal and according to the frequency control signal outputting a counting signal; and a memory, used for receiving the counting signal and the clock signal and according to the counting signal outputting the first frequency signal corresponding to a numerical value stored in a corresponding bit address.

11. The frequency shift keying demodulator robust for frequency offset as recited in claim 10, wherein the microprocessor comprises:

a lookup table (LUT), used for providing a relationship between the phase control signal and the duty cycle of the demodulated signal and providing a relationship between the frequency control signal and the duty cycle of the demodulated signal.

12. The frequency shift keying demodulator robust for frequency offset as recited in claim 7, wherein the microprocessor comprises:

a lookup table (LUT), used for providing a relationship between the phase control signal and the duty cycle of the demodulated signal.

13. The frequency shift keying demodulator robust for frequency offset as recited in claim 7, wherein the phase difference generator comprises:

N pieces of delay components, wherein each delay component is used for delaying the input signal by a preset time and outputting the delayed input signal; the output end of the $I^{th}$ delay component is coupled to the input end of the $(I+1)^{th}$ delay component; the first delay component is used for receiving the baseband signal, where both N and I are natural numbers and $0<I<N$; and a selection component, used for according to the phase control signal selecting the signal output from a delay component selected from all the delay components as the baseband signal with phase difference.

* * * * *